United States Patent
Engel et al.

(10) Patent No.: US 8,141,261 B2
(45) Date of Patent: Mar. 27, 2012

(54) FEELER PIN AND FEELER HEAD FOR A COORDINATE MEASURING MACHINE

(75) Inventors: Thomas Engel, Aalen (DE); Frank Richter, Heidenheim (DE)

(73) Assignees: Carl Zeiss Industrielle Messtechnik GmbH, Oberkochen (DE); Carl Zeiss 3D Automation GmbH, Oberkochen (DE)

( * ) Notice: Subject to any disclaimer, the term of this patent is extended or adjusted under 35 U.S.C. 154(b) by 0 days.

(21) Appl. No.: 12/974,314

(22) Filed: Dec. 21, 2010

(65) Prior Publication Data
US 2011/0146092 A1  Jun. 23, 2011

(30) Foreign Application Priority Data
Dec. 22, 2009 (DE) .......................... 10 2009 060 784

(51) Int. Cl.
*G01B 5/004* (2006.01)
(52) U.S. Cl. ........................................... 33/503; 33/560
(58) Field of Classification Search .................... 33/503, 33/556, 557, 560, 561
See application file for complete search history.

(56) References Cited

U.S. PATENT DOCUMENTS

| | | | |
|---|---|---|---|
| 4,509,266 A | 4/1985 | Cusack | |
| 5,065,526 A | 11/1991 | Bryer | |
| 5,150,529 A * | 9/1992 | Collingwood | 33/503 |
| 6,487,896 B1 | 12/2002 | Dall'Aglio | |
| 7,665,219 B2 * | 2/2010 | Styles et al. | 33/503 |
| 2001/0034948 A1 * | 11/2001 | Matsumiya et al. | 33/553 |
| 2004/0134085 A1 * | 7/2004 | Fuge | 3/556 |
| 2004/0185706 A1 | 9/2004 | Price et al. | |
| 2008/0016711 A1 | 1/2008 | Baebler | |
| 2008/0052936 A1 | 3/2008 | Briggs et al. | |
| 2009/0049704 A1 * | 2/2009 | Styles et al. | 33/503 |
| 2011/0094117 A1 * | 4/2011 | Groell | 33/503 |
| 2011/0192044 A1 * | 8/2011 | Usui | 33/503 |

FOREIGN PATENT DOCUMENTS

| | | |
|---|---|---|
| DE | 88 13 875 | 2/1989 |
| DE | 10 2004 011 728 A1 | 9/2005 |
| DE | 10 2006 033 443 A1 | 1/2008 |
| DE | 10 2007 021 362 A1 | 11/2008 |
| EP | 1 643 208 A2 | 5/2006 |

* cited by examiner

*Primary Examiner* — G. Bradley Bennett
(74) *Attorney, Agent, or Firm* — Harness, Dickey & Pierce, P.L.C.

(57) ABSTRACT

The present invention relates to a feeler pin for a coordinate measuring machine. The feeler pin comprises a shaft having a first end and a second end, a fastening sleeve for fastening the feeler pin in a feeler pin holder, and an identification device for identifying the feeler pin. A feeler object is provided at the first end of the shaft, wherein the identification device can be read out via a first contact and a second contact. Further, it is provided that the second end of the shaft and the fastening sleeve are connected by a plastic section, wherein the first contact is provided by the fastening sleeve, and the second contact is provided by a rotationally symmetrical contact device which is electrically insulated from the fastening sleeve by the plastic section. Further, the present invention relates to a feeler head for holding the at least one feeler pin.

20 Claims, 4 Drawing Sheets

FEELER PIN AND FEELER HEAD FOR A COORDINATE MEASURING MACHINE

CROSS-REFERENCES TO RELATED APPLICATIONS

This application claims the priority of German patent application DE 10 2009 060 784.6, filed on Dec. 22, 2009. The entire content of this priority application is incorporated herein by reference.

BACKGROUND OF THE INVENTION

The present invention relates to a feeler pin and a feeler head for coordinate measuring machine.

Coordinate measuring machines are generally known in the prior art. They serve for measuring test objects, for example in quality assurance. It is possible in principle to make use of various sensor systems to detect the coordinates of the test object. By way of example, it is customary to use optical sensors, but in particular also tactile sensors which sense selected points of the test object and determine the coordinates of the scanned point.

For this purpose, a coordinate measuring device has a feeler head in which there is located a sensor arrangement which can detect a deflection of a feeler pin which scans the test object with the aid of a feeler object. Previously determined calibration data can be used to determine from the sensor signals the position of the feeler object relative to the feeler head, and also to determine the coordinates of the sensed point on the basis of the known position of the feeler head in the coordinate measuring machine.

Depending on the geometry of the test object, it can be required in some circumstances to change the feeler pin during a test operation. For example, it can be required to make use of a feeler pin which is thinner, thicker or bent, or else of a feeler object of different shape. The feeler objects can, for example, be designed as a ball or else as a cylinder.

To date, it has been necessary each time when changing the feeler pin to carry out renewed calibration of the feeler pin and/or the coordinate measuring machine in order to be able to draw an exact conclusion on the coordinates of the scanned point from the sensor signals. However, in the prior art methods have also been proposed for calculating the calibration data of a specific feeler pin in advance, and storing them in the coordinate measuring machine. If the coordinate measuring machine then later makes recourse to this feeler pin, it is then possible to appeal to these calibration data without renewed calibration.

However, this requires that the coordinate measuring machine be able to completely identify the feeler pin used. It has been proposed for this purpose in the publication US 2008/0052936 A1 to provide the feeler pin with an identification chip which can be read out via the feeler head. For this purpose, data via which the feeler pin can be uniquely identified are stored in the identification chip.

Possibilities for wireless as well as wired connections are specified in the prior art for the use of the identification chip with the coordinate measuring machine.

Thus, for example, publication DE 10 2006 033 443 A1 exhibits a feeler pin with an integrated RFID chip for the wireless connection of the identification chip, configured as an RFID chip, to the coordinate measuring machine. Such wireless connection methods require, for example, an autonomous energy supply inside the feeler pin, for example by means of a battery.

In the case of wired identification chips, it is possible for them to be included in a circuit via the connection, and thus to be read out without a dedicated energy supply. For this purpose, the identification chip can be configured as, for example, a read only memory which, once it has been written to, retains the stored data even without energy supply. However, this requires provision of suitable contacts. It is to be ensured in this case that any possible current flow does not corrupt the measurement results.

The publication EP 1 643 208 A2 proposes to provide the contacts via the bearings of the feeler pin plate in the feeler head.

As a rule, a feeler pin has a fastening sleeve which can, in particular, have an external thread. This fastening sleeve is used to screw the feeler pin into the feeler head. A particular thread diameter can be required for this purpose depending on the feeler head used. However, since the feeler pins are the same as a rule, feeler pins of the same design with different fastening sleeves are provided which can differ from one another depending on the type of fastening and dimensioning.

In order to simplify the production of such feeler pins, it has been proposed to connect a shaft of the feeler pin which supports the feeler object, for example a feeler ball, to the fastening sleeve by means of an injection moulding method. The injected plastic in this case insulates the fastening sleeve and the shaft from one another electrically thus resulting in new possibilities and requirements for providing such a feeler pin, which has an identification chip, with contacts.

Furthermore, by way of example the contacts described in the US 2008/0052936 A1 mentioned above have a specific orientation which is to be observed for the purpose of making a secure contact. Consequently, this publication proposes a pin which latches tight in a specific orientation and thus ensures secure contact with the feeler pin in the feeler head. Thus, secure contact is obtained only in a specific position of the feeler pin relative to the feeler head.

SUMMARY OF THE INVENTION

It is therefore an object of the present invention to specify a feeler pin and a feeler head to enable a structurally simple and reliable contact to be made with the identification chip in order to read out the latter.

In accordance with a first aspect of the invention, it is therefore provided a feeler pin for a coordinate measuring machine, the feeler pin comprising a shaft having a first end and a second end, a fastening sleeve for fastening the feeler pin in a feeler pin holder, and an identification device for identifying the feeler pin, a feeler object being provided at the first end of the shaft, and wherein the identification device can be read out via a first contact and a second contact, wherein the second end of the shaft and the fastening sleeve are connected by a plastic section, the first contact being provided by the fastening sleeve, and the second contact being provided by a rotationally symmetrical contact device which is electrically insulated from the fastening sleeve by the plastic section.

The result of this is that the desired contact can be made with the identification device in feeler pins for which the plastic section has been produced, for example, by means of an injection moulding method for connecting the fastening sleeve to the shaft. Furthermore, there is no need for a specific orientation of the feeler pin in the feeler pin holder in order to close the first contact and the second contact. Since the first contact is provided by means of the fastening sleeve surrounding the shaft of the entire circumference, and the second contact is provided in a rotationally symmetrical fashion by the contact device, a secure contact is provided in each orientation.

In accordance with a second aspect of the invention, it is proposed feeler head for holding at least one feeler pin, the feeler head comprising at least one mating fastening device for holding a fastening sleeve of the feeler pin, and at least one pair of mating contacts which has a first mating contact and a second mating contact, wherein the first mating contact is formed by the mating fastening device, and the second mating contact is designed to make contact with a rotationally symmetrical contact device of the feeler pin.

In this way, the feeler head according to the second aspect of the invention forms a corresponding mating element for the feeler pin according to the first aspect of the invention which mating element is designed to hold a feeler pin according to the first aspect of the invention.

This enables a feeler pin to be uniquely recognized, and the coordinate measuring machine can automatically determine whether a feeler pin has been changed.

In one refinement of the invention, it can be provided that the contact device is formed by a shaft end of the shaft, the shaft end penetrating the plastic section.

In a cured state, the plastic section therefore forms a sleeve which surrounds the shaft and is arranged between the shaft and the fastening sleeve. However, contact can be made with the shaft or a head end of the shaft such that this shaft end provides the contact device which forms the second contact.

A first possibility of providing the contact device is created in this way.

In an alternative further refinement, the plastic section has at least partially an electrically conductive coating which forms the contact device.

Injection moulding technology can be used to process plastics which can be subsequently activated with the aid of a laser and printed metallically. It is possible in this way to apply in the plastic section of the feeler pin a conductive structure which then forms the contact device.

In both refinements, the identification device is designed in such a way that it is connected to the first contact and the second contact in order to be read out via the first contact and the second contact.

In particular, in a further refinement, it can be provided that the coating is of annular design. In this way, the rotational symmetry required of the contact device is provided with particular ease.

In a further refinement, it can be provided that the fastening sleeve is a threaded sleeve. The feeler pin can easily be screwed into a corresponding mating thread of a feeler head by means of a threaded sleeve. A first contact can simultaneously be provided.

In the case of the feeler head according to the second aspect of the invention, it can be provided in a refinement that the second mating contact for making contact with the rotational symmetrical contact device of the feeler pin is a spring pin.

The spring pin is correspondingly in the direction of a feeler pin held in the feeler head such that the spring pin is pressed against the contact device.

In a further refinement, it can be provided that the feeler head is designed to hold more than one feeler pin, and that more than one pair of mating contacts is provided, because each pair of mating contacts is assigned a position marking device which can be read out together with a respective identification device of a feeler pin.

Feeler heads which can hold a plurality of feeler pins are frequently provided on coordinate measuring devices. Of course, it is required in this case not only that a feeler pin can be recognized as such by means of the identification device, but there is also a need to recognize where the respective feeler pin is held in the feeler head. Consequently, each feeler pin holder of the feeler head has a position mark which, for example, can be connected in series with one of the mating contacts such that it can be read out together with the identification device, and that it is possible to produce a corresponding linkage between a specific feeler pin which has been recognized with the aid of the identification device, and a respective feeler pin holder which has been recognized on the respective position marking device. In one development, it can be provided that the information from identification devices and position marking devices linked in such a way is transmitted in wireless fashion to the coordinate measuring machine or a data processing unit of the coordinate measuring machine. In this case, a wired connection then exists between the identification device and the position marking device, the circuit thus produced being, in turn, connected in wireless fashion to the coordinate measuring machine or a data processing unit of the coordinate measuring machine. In a further development, it is also possible to design the connection between the identification device and the position marking device in wireless fashion, for example by means of suitable RFID chips. The further transmission to the coordinate measuring machine or a data processing unit of the coordinate measuring machine will then likewise be designed in wireless or wired fashion.

In a refinement, it is possible to provide a switch in order to selectively read out a position marking device and an identification device.

If a plurality of feeler pins is held in the feeler head, it is no longer possible to read out simultaneously all the identification devices and position marking devices, for example by connecting a series circuit via all the identification devices and position marking devices. Provision is correspondingly made of a switch which can selectively read out a feeler pin holder or a corresponding position marking device and an identification device of the feeler pin held in the feeler pin holder. In one development, it is possible to provide that the switch switches automatically at specific time intervals in order, for example, to uniquely read out in sequence all the identification devices and position marking devices. Alternatively, it is also possible to conceive a branched circuit system such that it is possible to read out all identification devices and position marking devices.

In another refinement, it can also be provided that the at least one mating fastening device can be swiveled in order to selectively read out a position marking device and an identification device.

Correspondingly, the interconnections are then appropriately arranged on the feeler head such that in each case only one feeler pin which is located in a specific position, for example a measuring position, is read out. The remaining feeler pins are then located merely in a waiting position in which they are not read out. Another feeler pin is swiveled to the measuring position by swiveling the feeler pin holders and can therefore be read out automatically. Various types of magazines, for example a revolver magazine, are conceivable for this purpose.

The data stored in the identification device can comprise all data which are suitable for describing properties of the feeler pin. In addition to a serial number, material data and data relating to the application, it is possible, moreover, to store compliance matrices, inherent weight matrices and other data required to calibrate the feeler pin. Since often only little storage space is present in the identification devices, it can also be provided that the identification device includes information relating to the storage location or directory location in which the above named data are then stored.

It goes without saying that the previously mentioned features, and those still to be explained below, can be used not only in the respectively specified combination, but also in other combinations and on their own, without departing from the scope of the present invention.

BRIEF DESCRIPTION OF THE DRAWINGS

Exemplary embodiments of the invention are illustrated in the drawing and explained in more detail in the following description. In the drawing.

DESCRIPTION OF PREFERRED EMBODIMENTS

Figure 1:
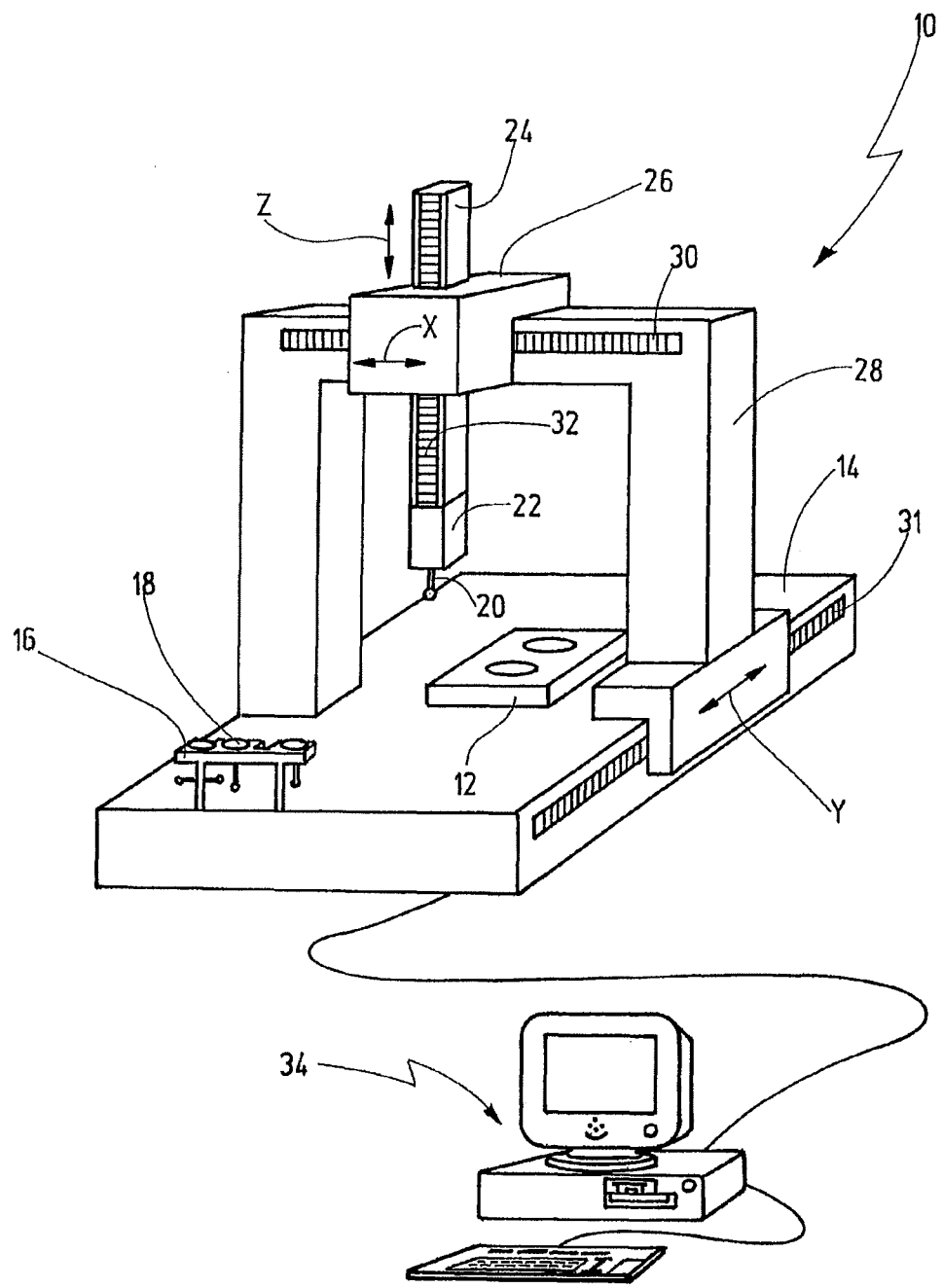
FIG. 1 shows a schematic perspective view of a coordinate measuring machine.

FIG. 1 shows a schematic view of a coordinate measuring machine 10. The coordinate measuring machine 10 serves the purpose of measuring a test object 12 which is arranged on a base plate 14 of the coordinate measuring machine 10.

A magazine 16 for keeping a plurality of replacement feeler pins 18 can be provided on the base plate 14. It can be provided that the coordinate measuring machine 10 can selectively remove replacement feeler pins 18 from the magazine.

Arranged on the coordinate measuring machine 10 is a feeler pin 20 which serves the purpose of measuring the work piece 12. The coordinate measuring machine 10 can also, as appropriate, store the feeler pin 20 in the magazine 16, and remove one of the replacement feeler pins 18.

The feeler pin 20 is arranged in a feeler head 22. This is usually implemented by means of a sensor arrangement such as is described, for example, in the publication DE 10 2004 011 728 A1. A deflection of the feeler pin 20 relative to the feeler head 22 can be detected by means of the sensor arrangement.

The feeler head 22 is fastened on a quill 24. The quill 24 is supported displaceably on a slide 26 which, in turn, is supported displaceably on a portal 28. The quill 24 is displaceable in a Z-direction in the slide 26. The slide 26 can be displaced in an X-direction of the portal 28. The portal 28 can be displaced in a Y-direction on the base plate 14. The feeler pin 20 can thus be moved in three dimensions in a desired direction in order to sense the test object 12.

As has already been stated above, the relative position of the feeler pin 20 in the feeler head 22 can be determined by means of the sensor arrangement (not illustrated) of the feeler head 22. The position of the feeler head 22 can be read out in an X-direction with the aid of a scale 30, in a Y-direction with the aid of a scale 31, and in a Z-direction with the aid of a scale 32. As a rule, the scales are read out electronically by means of a suitable sensor device which is capable of scanning the scales 30, 31, 32.

Also provided is a data processing unit 34 which is capable of recording all the data detected by the coordinate measuring machine 10, and storing and evaluating them, if appropriate. The data processing unit 34 also undertakes all calibration operations and also serves the purpose of controlling the coordinate measuring machine 10.

Figure 2:
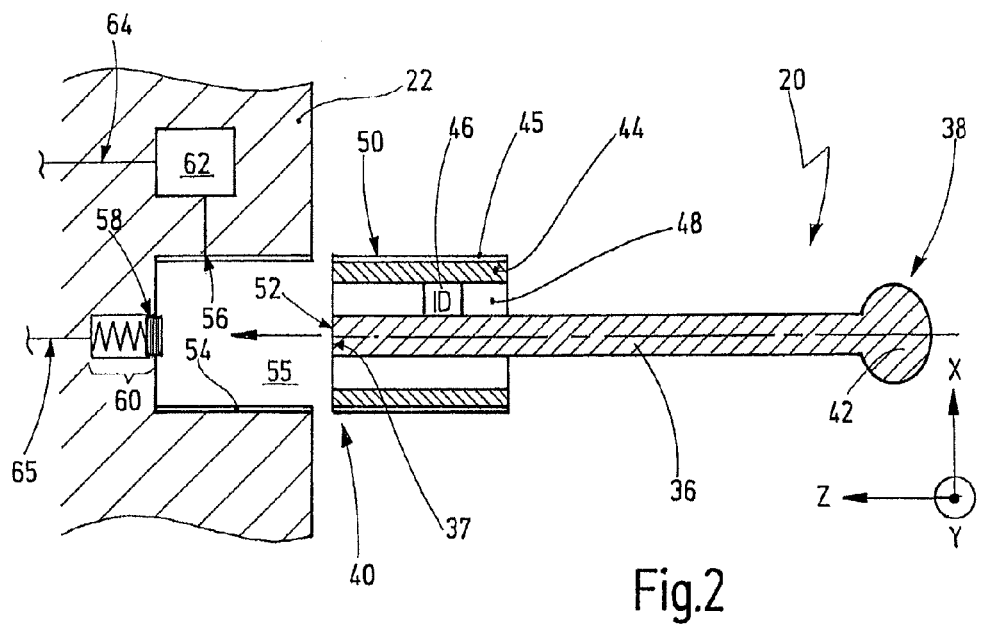
FIG. 2 shows a schematic cross section of a feeler pin according to a first aspect of the invention, and of a feeler head according to a second aspect of the invention, the feeler pin and the feeler head being illustrated in a first embodiment of the invention.

FIG. 2 shows the feeler pin 20 according to a first embodiment. The feeler head 22 is also correspondingly illustrated in a first embodiment.

The feeler pin 20 has a shaft 36, the shaft 36 having a shaft end 37.

The shaft end 37 is situated opposite a first end 38 of the feeler pin 20 at a second end 40 of the feeler pin 20.

A feeler object 42 is provided at the first end 38 of the feeler pin 20. The feeler object 42 can be a ball, for example.

The feeler pin 20 further has a fastening sleeve 44 which is provided for the purpose of fastening the feeler pin 20 in the feeler head 22. The fastening sleeve 44 is designed as a threaded sleeve and has a thread 45. The feeler pin 20 can be screwed into the feeler head 22 by means of the thread 45.

The feeler pin 20 further has an identification device 46, which serves the purpose of identifying the feeler pin 20. The identification device 46 makes contact in a conducting fashion with the shaft 36 and the fastening sleeve 44.

A plastic section 48 which is provided by an injection moulding method is provided in order to connect the shaft to the fastening sleeve 44. It is possible in this way for the shaft 36 to be connected to the fastening sleeve 44 in a way that is simple and electrically insulating, and for the identification device 46 also to be securely fixed in its place.

A first contact 50 is therefore provided by the thread 45 of the fastening sleeve 44 for the purpose of reading out the identification device 46. A second contact 52 is provided by the end 37 of the shaft 36 for the purpose of reading out the identification device 46.

The feeler head 22 has an internal thread 54 in a feeler pin holder 55. The internal thread 54 can be screwed with the thread 45 of the feeler pin 20.

The first contact 50 is produced in this way by screwing the internal thread 54 with the thread 45 of the first contact 50.

The internal thread 54 therefore forms a first mating contact 56 of the feeler head 22.

A second mating contact 58 of the feeler head 22 is provided by a spring pin 60. If the feeler pin 20 is screwed with the feeler head 22, the shaft end 37 comes to bear against the spring pin 60, the spring pin being pressed against the second shaft end 37. The connection between the second contact 52 and the second mating contact 58 is produced in this way between the spring pin 60 and the shaft end 37.

The identification unit 46 can thus be read out, for example by the data processing unit 34, when the feeler pin 20 is screwed into the feeler pin holder 55.

Moreover, it is also possible to provide in the feeler head 22 a position marking device 62 which can be read out together with the identification device 46. The position marking device 62 serves the purpose of uniquely characterizing the feeler pin holder 55. If a plurality of feeler pin holders 55 are provided in the feeler head 22, it is possible not only to uniquely recognize the feeler pin 20 by means of the identification device 46, but the feeler pin 20 can also be uniquely assigned to a specific feeler pin holder 55 by means of the position marking device 62.

Provided for the purpose of extending the first mating contact 56 and the second mating contact 58 are lines 64, 65 which provide a connection to the remaining coordinate measuring machine 10 and, in particular, to the data processing unit 34.

Figure 3:
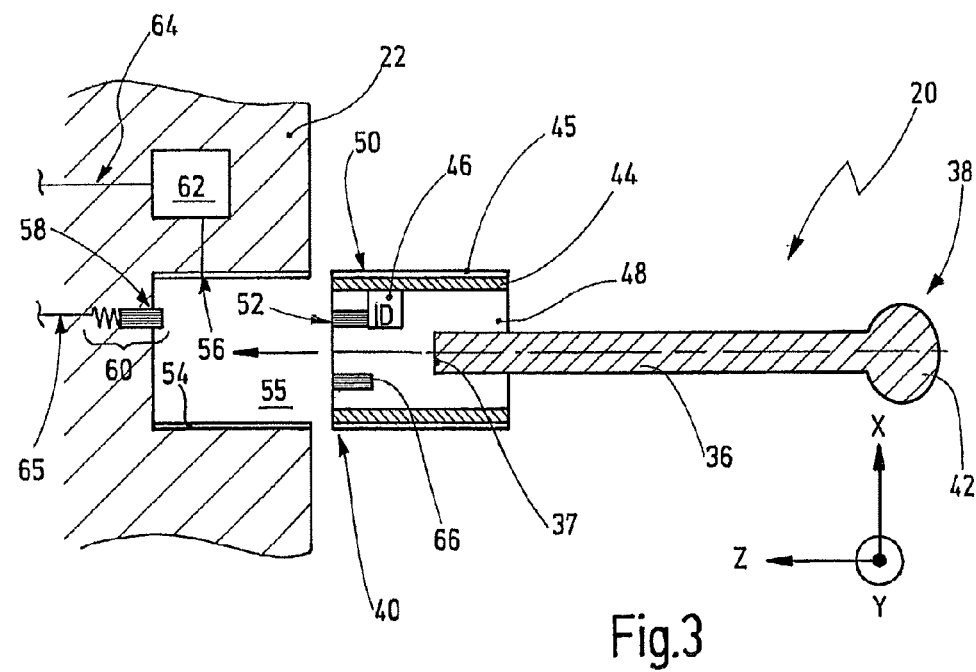
FIG. 3 shows a feeler pin according to the first aspect of the invention, and the feeler head according to the second aspect of the invention, the feeler pin and the feeler head being illustrated in a second embodiment of the invention.

FIG. 3 shows an alternative embodiment of the feeler pin 20 and of the feeler head 22.

In this embodiment, the first contact 50 is not formed by the shaft end 37 of the shaft 36, but the second contact 52 is provided by an annular coating 66 of the plastic section 48. In this case, therefore, the shaft end 37 does not penetrate the plastic section, that is to say the shaft end 37 does not emerge from the plastic section 48 in the direction of the feeler pin holder 55.

The second mating contact 58 is again provided via a spring pin 60.

It is possible by means of the embodiments illustrated in FIGS. 2 and 3 to achieve, in particular, that both the first contact 50 and the second contact 52 are produced independently of a rotary position or angular position of the feeler pin 20. Both the first contact 50 and the second contact 52 are of rotationally symmetrical design such that they are connected in any case to the first mating contact 56 and the second mating contact 58 when the feeler pin is screwed into the feeler pin holder 55 far enough.

Figure 4:
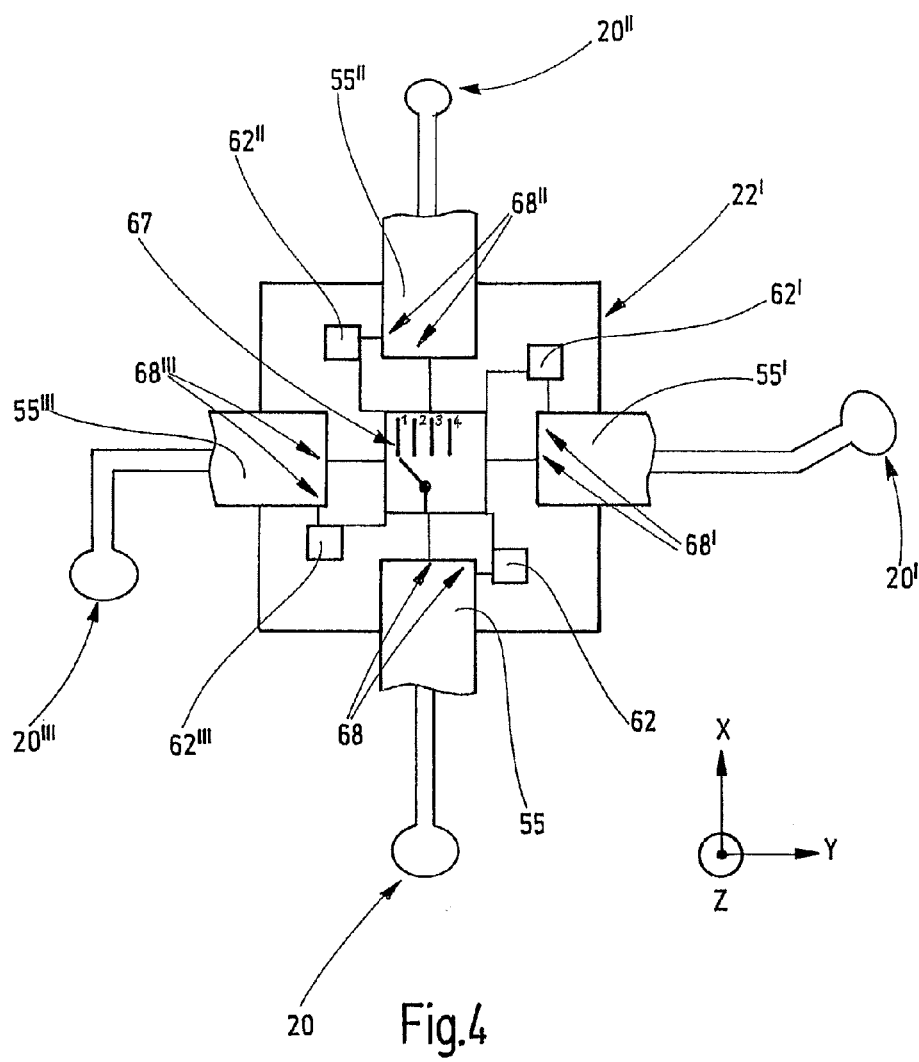
FIG. 4 shows a schematic top view of a feeler head according to a further embodiment of the invention.

FIG. 4 shows a feeler head 22' which is designed for holding four feeler pins 20, 20', 20", 20'". The connection between one of the feeler pins 20, 20', 20", 20'" and the feeler head 22' is respectively performed as illustrated in FIG. 2 or FIG. 4.

In order to respectively read out an identification device 46 on one of the feeler pins 20, 20', 20", 20'", a four-switch 67 is provided which can optionally be used to read out one of the identification devices 46. Correspondingly, it is possible to collect either a first pair of mating contacts 68, which has the first mating contact 56 and the second mating contact 58, or else to connect one of the other pairs of mating contacts 68', 68", 68'".

Correspondingly, there are also provided four position marking devices 62, 62', 62", 62'" which are respectively assigned to a feeler pin holder 55, 55', 55", 55'". The position marking devices 62, 62', 62", 62'" can be read out together with the identification devices 46 such that a feeler pin 20, 20', 20", 20'" can be uniquely assigned to one of the feeler pin holders 55, 55', 55", 55'".

It is possible, for example, to provide that the switch 67 is switched automatically in certain time intervals such that the position marking devices 62, 62', 62", 62'" and the corresponding identification markings 46 continue to be read out sequentially.

Figure 5:
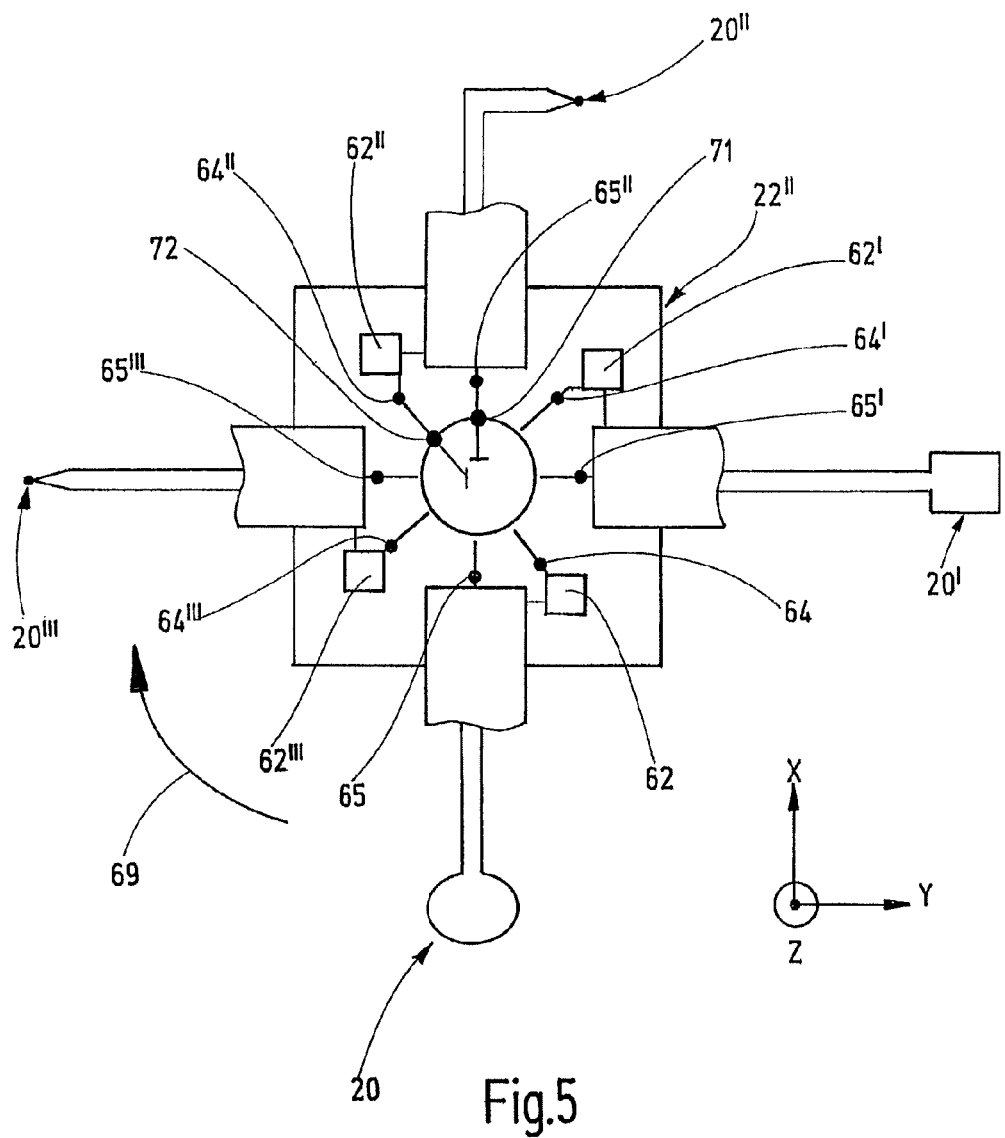
FIG. 5 shows a schematic top view of a feeler head according to yet a further embodiment of the invention.

A further embodiment of a feeler head 22" is illustrated in FIG. 5. The feeler head 22" is designed for holding a plurality of feeler pins 20, 20', 20", 20'". However, it does not have a switch 67. Instead of this, the feeler head 22" can be swiveled in a direction of rotation 69. Two latching contacts 71, 72 are provided which produce a connection to the respective first mating contact 56 or second mating contact 58 via the lines 64, 64', 64", 64'" and 65, 65', 65", 65'", respectively. If the feeler head 22" is swiveled in the direction of rotation 69, the latching contacts 71, 72 engage in one another with another pair of lines such that the identification device 46 of another feeler pin 20, 20', 20", 20'" and another position marking device 62, 62', 62", 62'" can be read out.

Of course, the circuit illustrated is to be understood in a purely diagrammatic fashion, it naturally being possible also to provide other circuits and contacts in order to change the read-out behaviour upon swiveling the feeler head 22". Again, the spatial arrangement of the feeler pins 20, 20', 20", 20'" in FIGS. 4 and 5 is to be understood merely as an example; it is possible in principle also to select another design.

What is claimed is:

1. A feeler pin for a coordinate measuring machine, the feeler pin comprising:
   a shaft having a first end and a second end and a longitudinal axis,
   a fastening sleeve for fastening the feeler pin in a feeler pin holder,
   an identification device for identifying the feeler pin, and
   a feeler object being provided at the first end of the shaft,
   wherein the identification device can be read out via a first contact and a second contact, wherein the second end of the shaft and the fastening sleeve are connected by a plastic section, and wherein the first contact is provided by the fastening sleeve, and the second contact is provided by a contact device which is electrically insulated from the fastening sleeve by the plastic section,
   wherein the contact device is rotationally symmetrical about the longitudinal axis, so that both the first contact and the second contact are produced independently of an angular position of the feeler pin such that they are connected to the first mating contact and the second mating contact when the feeler pin is screwed into the feeler pin holder.

2. The feeler pin according to claim 1, wherein the contact device is formed by a shaft end of the shaft, the shaft end penetrating the plastic section.

3. The feeler pin according to claim 1, wherein the plastic section has at least partially an electrically conductive coating which forms the contact device.

4. The feeler pin according to claim 3, wherein the coating is of annular design.

5. The feeler pin according to claim 1, wherein the fastening sleeve is a threaded sleeve.

6. A feeler pin for a coordinate measuring machine, the feeler pin comprising:
   a shaft having a first end and a second end,
   a fastening sleeve for fastening the feeler pin in a feeler pin holder,
   an identification device for identifying the feeler pin, and
   a feeler object being provided at the first end of the shaft,
   wherein the identification device can be read out via a first contact and a second contact, wherein the second end of the shaft and the fastening sleeve are connected by a plastic section, and wherein the first contact is provided by the fastening sleeve, and the second contact is provided by a rotationally symmetrical contact device which is electrically insulated from the fastening sleeve by the plastic section.

7. The feeler pin according to claim 6, wherein the contact device is formed by a shaft end of the shaft, the shaft end penetrating the plastic section.

8. The feeler pin according to claim 6, wherein the plastic section has at least partially an electrically conductive coating which forms the contact device.

9. The feeler pin according to claim 8, wherein the coating is of annular design.

10. The feeler pin according to claim 6, wherein the fastening sleeve is a threaded sleeve.

11. A feeler head for holding at least one feeler pin comprising a shaft having a first end and a second end and a longitudinal axis, a fastening sleeve for fastening the feeler pin in a feeler pin holder, an identification device for identifying the feeler pin, and a feeler object being provided at the first end of the shaft, wherein the identification device can be read out via a first contact and a second contact, wherein the second end of the shaft and the fastening sleeve are connected by a plastic section, and wherein the first contact is provided by the fastening sleeve, and the second contact is provided by a contact device which is electrically insulated from the fastening sleeve by the plastic section, wherein the contact device is rotationally symmetrical about the longitudinal axis, so that both the first contact and the second contact are produced independently of an angular position of the feeler pin such that they are connected to the first mating contact and the second mating contact when the feeler pin is screwed into the feeler pin holder; the feeler head comprising:
- at least one mating fastening device for holding a fastening sleeve of the feeler pin, and
- at least one pair of mating contacts which has a first mating contact and a second mating contact, wherein the first mating contact is formed by the mating fastening device, and the second mating contact is designed to make contact with a rotationally symmetrical contact device of the feeler pin.

12. The feeler head according to claim 11, wherein the second mating contact for making contact with the rotationally symmetrical contact device of the feeler pin is a spring pin.

13. The feeler head according to claim 11, wherein the feeler head is designed to hold more than one feeler pin, and more than one pair of mating contacts is provided, each pair of mating contacts being assigned a position marking device which can be read out together with a respective identification device of a feeler pin.

14. The feeler head according to claim 13, wherein a switch is provided for selectively reading out a position marking device and an identification device.

15. The feeler head according to claim 13, wherein the at least one mating fastening device can be swiveled in order to selectively read out a position marking device and an identification device.

16. A feeler head for holding at least one feeler pin comprising a shaft having a first end and a second end, a fastening sleeve for fastening the feeler pin in a feeler pin holder, an identification device for identifying the feeler pin, and a feeler object being provided at the first end of the shaft, wherein the identification device can be read out via a first contact and a second contact, wherein the second end of the shaft and the fastening sleeve are connected by a plastic section, and wherein the first contact is provided by the fastening sleeve, and the second contact is provided by a rotationally symmetrical contact device which is electrically insulated from the fastening sleeve by the plastic section; the feeler head comprising:
- at least one mating fastening device for holding a fastening sleeve of the feeler pin, and
- at least one pair of mating contacts which has a first mating contact and a second mating contact, wherein the first mating contact is formed by the mating fastening device, and the second mating contact is designed to make contact with a rotationally symmetrical contact device of the feeler pin.

17. The feeler head according to claim 16, wherein the second mating contact for making contact with the rotationally symmetrical contact device of the feeler pin is a spring pin.

18. The feeler head according to claim 16, wherein the feeler head is designed to hold more than one feeler pin, and more than one pair of mating contacts is provided, each pair of mating contacts being assigned a position marking device which can be read out together with a respective identification device of a feeler pin.

19. The feeler head according to claim 18, wherein a switch is provided for selectively reading out a position marking device and an identification device.

20. The feeler head according to claim 18, wherein the at least one mating fastening device can be swiveled in order to selectively read out a position marking device and an identification device.

* * * * *